United States Patent
Sood et al.

(10) Patent No.: US 7,764,650 B2
(45) Date of Patent: Jul. 27, 2010

(54) MOBILE STATION AND METHOD FOR FAST ROAMING WITH INTEGRITY PROTECTION AND SOURCE AUTHENTICATION USING A COMMON PROTOCOL

(75) Inventors: Kapil Sood, Beaverton, OR (US); Jesse R. Walker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1180 days.

(21) Appl. No.: 11/366,241

(22) Filed: Mar. 2, 2006

(65) Prior Publication Data

US 2007/0206535 A1 Sep. 6, 2007

(51) Int. Cl.
*H04W 4/00* (2009.01)
(52) U.S. Cl. .................... 370/331; 370/401; 455/432.1; 455/436
(58) Field of Classification Search .................. None
See application file for complete search history.

(56) References Cited

U.S. PATENT DOCUMENTS

2005/0207581 A1 9/2005 Qi et al.
2007/0043940 A1* 2/2007 Gustave et al. .............. 713/150

FOREIGN PATENT DOCUMENTS

WO WO-2007/106314 A2 9/2007
WO WO-2007/131237 A2 11/2007

OTHER PUBLICATIONS

"PCT Application No. PCT/US2007/004698, Written Opinion mailed Sep. 12, 2007", 7 pgs.
"PCT Application No. PCT/US2007/004698, International Search Report mailed Sep. 12, 2007", 3 pgs.
Sood, K., "802.11 TGr Just-In-Time Transition Acceleration Proposal (JIT-TAP) Proposal", *IEEE P802.11—Wireless Lans*, (doc: IEEE 802.11-05/0362rl,(May 2005),61 pgs.

* cited by examiner

*Primary Examiner*—David Q Nguyen
(74) *Attorney, Agent, or Firm*—Schwegman, Lundberg & Woessner, P.A.; Gregory J. Gorrie

(57) ABSTRACT

Embodiments of a mobile station and method for fast roaming in a wireless network using a fast-roaming protocol are generally described herein. Other embodiments may be described and claimed. In some embodiments, the fast-roaming protocol has a predetermined structure including an integrity check which remains independent of the route taken by messages.

26 Claims, 5 Drawing Sheets

MOBILE STATION AND METHOD FOR FAST ROAMING WITH INTEGRITY PROTECTION AND SOURCE AUTHENTICATION USING A COMMON PROTOCOL

TECHNICAL FIELD

Some embodiments of the present invention pertain to wireless communication networks. Some embodiments pertain to wireless local area networks (WLANs), and some embodiments pertain to broadband wireless-access (BWA) networks. Some embodiments pertain to the communication of voice and video over wireless communication networks, including voice-over-Internet protocol (IP) and video-over-IP communications.

BACKGROUND

In many conventional communication networks that include wireless and/or wireline communication paths, message integrity checks generally depend on the route taken by the message. This introduces significant processing discrepancies and distinct layer-level violations, which may have an adverse affect of making higher-level layer operations dependent on lower-level functions. In many wireless networks, system components at each level generally do not have knowledge of other levels, making the design overly complex. As a result, handing off between access points and securely associating with another access point can be time-consuming and less secure.

Thus, there are general needs for methods for fast roaming that can provide integrity protection and source authentication in wireless networks. There are also general needs for methods for fast roaming that can provide integrity protection and source authentication in wireless networks without distinct layer-level violations.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
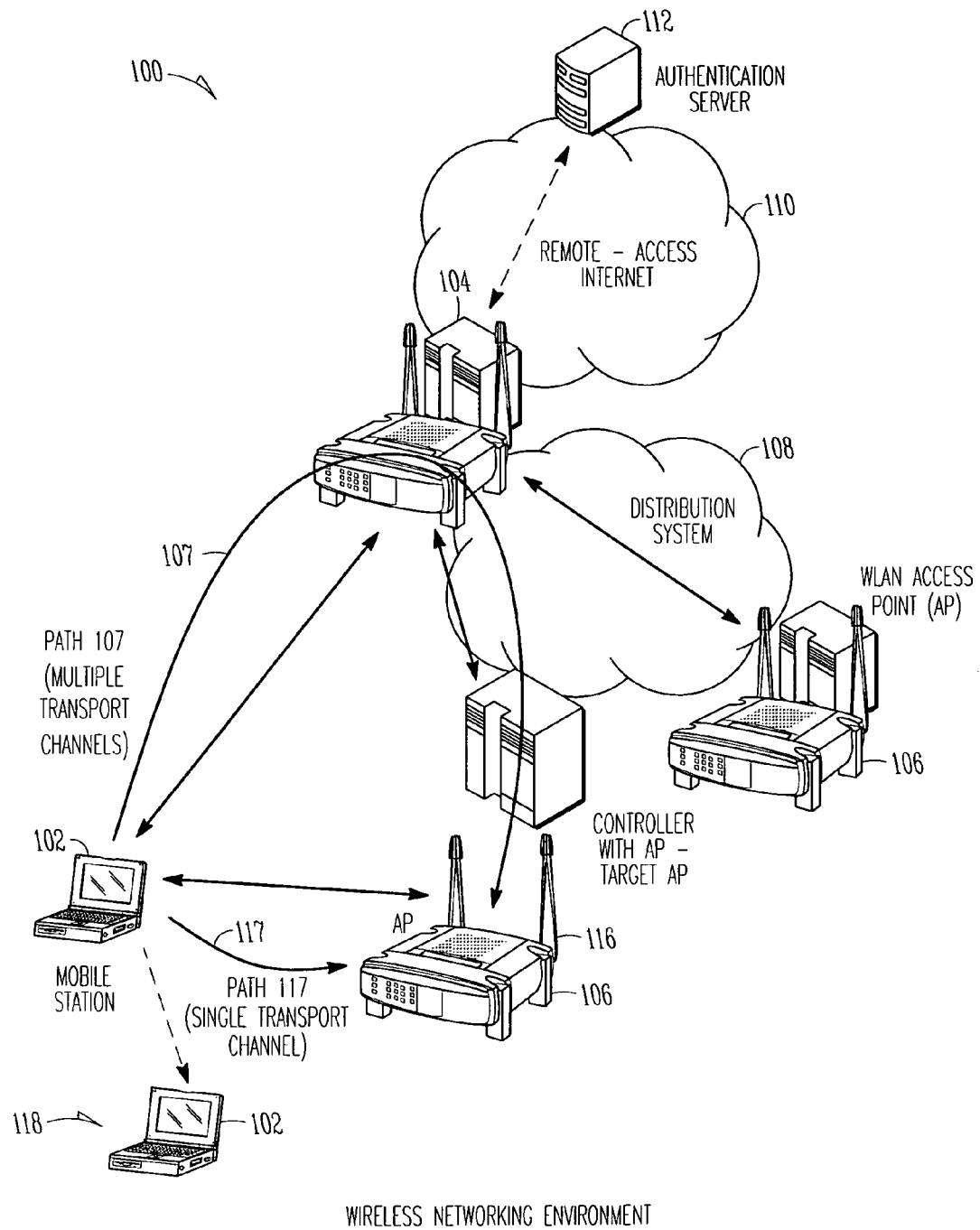
FIG. 1 illustrates a wireless networking environment in accordance with some embodiments of the present invention.

FIG. 1 illustrates a wireless networking environment in accordance with some embodiments of the present invention. Wireless networking environment 100 includes mobile station 102 and a plurality of access points (APs), show generally as access point 104 and access points 106. Mobile station 102 may be currently associated with access point 104 and may wish to hand-off communications to another access point, such as one of access points 106. Wireless networking environment 100 may also include distribution system 108 to provide communications between the access points which may be coupled to a remote-access network, such as remote-access Internet 110. Wireless networking environment 100 may also include authentication server 112, which may be a remote authentication dial-in user (RADIUS) type server, for providing security-related services. Distribution system 108 may comprise any type of wired and/or wireless networks and may include combinations of one or more types of networks. For example, distribution system 108 may include broadband wireless-access (BWA) networks, wireless local area networks (WLANs), Ethernet-type networks, and/or transmission control protocol/Internet protocol (TCP/IP) networks, although the scope of the invention is not limited in this respect. In some embodiments, distribution system may be a cellular packet data network, such as a third-generation (3G) or a third-generation partnership project (3GPP) cellular network, or a global system for mobile communications (GSM) cellular network including a general packet radio service (GPRS) network. In some embodiments, distribution system 108 may be a multi-hop network.

In accordance with some embodiments, fast roaming may be performed by mobile station 102 by pre-reserving bandwidth and/or pre-establishing communication session parameters for fast roaming during a current communication session, such as a voice-over-IP communication session, a video-over-IP communication session, or other delay-sensitive communication session. In these embodiments, fast roaming can be accomplished because when mobile station 102 decides to roam (i.e., hand-off communications to one of access points 106), there is little or no delay associated with establishing communication session parameters including session keys. In these fast-roaming embodiments, a common or a fast-roaming protocol provides a common end-to-end protocol that may allow a consistent approach to implement fast roaming, regardless of the path taken by the packets and the intermediate encapsulations (e.g., path 107 with multiple transport channels or path 117 with a single transport channel). In these embodiments, an integrity check (e.g., a message integrity code (MIC)) within common protocol messages may be independent of the route taken by the messages. In this way, layer-level violations associated with convention approaches may be avoided.

In accordance with some embodiments, mobile station 102 may send a request message in accordance with the common protocol either directly to one or more target access points 106 (e.g., over path 117) or indirectly through a currently associated access point 104 to one or more target access points 106 (e.g., over path 107). In some embodiments, the request message may be a request to pre-reserve bandwidth and pre-establish communication session parameters with the target access points 106. In these embodiments, the request message may be either a pre-reservation request message or a base mechanism request message discussed in more detail below. When mobile station 102 decides to roam (illustrated at location 118), mobile station 102 may send a secured communication session establishment request and response messages in accordance with the common protocol either directly to selected target access point 116 or indirectly through currently associated access point 104 to selected target access point 116. In these embodiments, the predetermined structure of the common protocol including an integrity check remains unchanged within the various transport-layer protocols.

Figure 2:
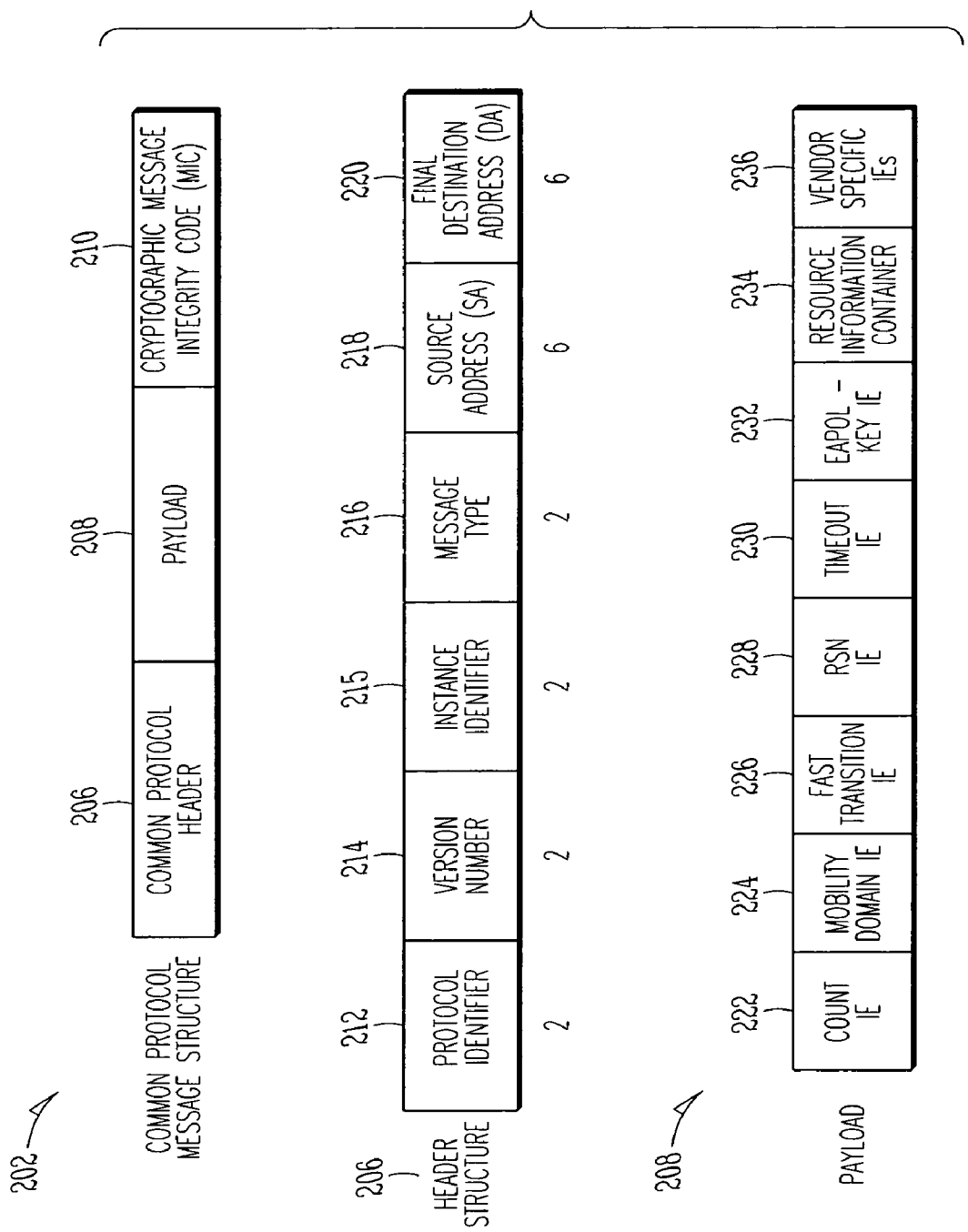
FIG. 2 illustrates a structure of a common protocol message in accordance with some embodiments of the present invention.

FIG. 2 illustrates a structure of a common protocol message in accordance with some embodiments of the present invention. In accordance with some embodiments, a common protocol message may comprise predefined structure 202 including common protocol header 206, common protocol payload 208 and cryptographic message integrity code (MIC) 210. Cryptographic message integrity code 210 may be calculated using a cryptographic technique (e.g., a hash) based on both common protocol header 206 and common protocol payload 208. The common protocol message of structure 202 may be wrapped, unwrapped, and rewrapped in one or more transport-layer encapsulations, discussed in more detail below. However the integrity check of cryptographic message integrity code 210 is independent of the transport-layer encapsulations. The cryptographic technique for the calculation of cryptographic message integrity code 210 may include almost any pseudorandom function (PRF) including a hash message authentication code (HMAC) in accordance with a secure hash algorithm (SHA) (e.g., HMAC-SHA1), an HMAC-SHA256, and/or an advanced encryption system (AES) algorithm, such as a cipher-based message authentication code (CMAC) (e.g., AES-CMAC) performed after session keys are derived. In these embodiments, cryptographic message integrity code 210 may be part of structure 202 after session keys have been derived. For common protocol messages which session keys are not yet derived, cryptographic message integrity code 210 may be a null field. As discussed above, cryptographic message integrity code 210 may be calculated over the entire common protocol header and the common protocol payload fields so that any forgeries and alterations may be more easily detected. For messages which are not integrity protected, cryptographic message integrity code 210 may be null, although the scope of the invention is not limited in this respect.

In some embodiments, common protocol header 206 may include protocol identifier field 212, version number field 214, message type field 216, source address (SA) field 218 and final destination address (DA) field 220, although the scope of the invention is not limited in this respect. Protocol identifier field 212 may indicate a particular identifier for the common protocol and version number field 214 may indicate a version number for the common protocol in which the message is currently constructed. In some embodiments, protocol identifier field 212 may indicate the routing and switching of the common protocol frames in the network.

Message type field 216 may indicate the type of message within the encapsulated payload. In some embodiments, this may allow the payload length to be determined from the message type. In some embodiments, message type field 216 may indicate whether the common protocol message is a pre-reservation request message, a pre-reservation response message, a secure pre-reservation confirmation message, a secure pre-reservation acknowledge (ACK) message, a secured reassociation request message, or a secured reassociation response message. These embodiments are discussed in more detail below. In accordance with some embodiments, the pre-reservation request and response messages and/or the secure pre-reservation confirmation and acknowledge messages may be used to pre-reserve bandwidth and/or establish communication session parameters with one or more other target access points to enable fast roaming. These embodiments are also discussed in more detail below.

In some embodiments, message type field 216 may also indicate whether the common protocol message is a base mechanism request message, a base mechanism response message, a query request message or a query response message. In some embodiments, the base mechanism request and response messages may be used to pre-reserve bandwidth and/or pre-establish communication session parameters. The base mechanism request and response messages may be used as alternatives to pre-reservation request and response messages. In some embodiments, query response and request messages may be used to check the capacities of other access points without pre-reserving bandwidth or establishing communication session parameters. Query response and request messages may also be used to acknowledge the existence of a resource, such as those resources at another access point.

Source address field 218 may indicate the media-access control (MAC) address of the originator of the payload and final destination address field 220 may indicate the MAC address of the final destination of the payload. In some embodiments, the source and destination addresses may be used to bind the end points using cryptographic message integrity code 210 providing source and destination authentication and integrity.

In some embodiments, header structure 206 may also include instance identifier field 215 which may include an instance identifier. The instance identifier may be used by the common protocol to distinguish multiple simultaneous running instances of the common protocol and may be calculated at both ends of the common protocol (i.e., by the mobile station and target access point). In some embodiments, a single common protocol end-point entity (e.g., an authenticator) may be executing multiple common protocols with one or more mobile stations. In these embodiments, the instance identifier may be a globally unique identifier that may be generated by performing a pseudorandom hash of the mobile station MAC address, the access point MAC address, a source generated random number (e.g., the SNonce) and/or a destination generated random number (e.g., the ANonce). In these embodiments, the common protocol may use instance identifier 215 in its security association. In some embodiments, the ANonce may be an unpredictable random number generated by the target access point and sent to the mobile station, and the SNonce may be an unpredictable random number generated by the mobile station and sent to the target access point. In these embodiments, the SNonce and the ANonce may be contained within payload information elements and used in session key generation. In accordance with the common protocol, each end-to-end entity may provide a random input (e.g., the SNonce and the ANonce) allowing each entity to derive the session keys. This provides for key separation and helps avoid 'man-in-the-middle' attacks on the common protocol.

Common protocol payload 208 may depend on the message type and may include a plurality of information elements (IEs), examples of which are illustrated in FIG. 2. In some embodiments, common protocol payload 208 may include one or more of the following information elements depending on the message type: count IE 222, mobility domain IE 224, fast transition IE 226, robust security network (RSN) IE 228, time-out IE 230, Extensible Authentication Protocol over LANs (EAPOL) Key IE 232, resource information container 234 and one or more vendor-specific IEs 236, although the scope of the invention is not limited in this respect. Count IE 222 may identify the length of payload 208. Mobility domain IE 224 may indicate a mobility domain policy. Fast transition IE 226 may indicate the key holder identifiers. RSN IE 228 may include information for the IEEE 802.11i RSN. Timeout IE 230 may indicate an expiration time for session keys and/or an amount of time that the communication resources are reserved at a target access point. EAPOL-Key IE 232 may include the EAPOL encryption key name and/or one or more broadcast keys, as well as other security-related information. Resource information container 234 may include, for example, quality-of-service level requests and responses for reserving traffic class and prioritization modes for real-time communications, such as voice and video. Vendor-specific IEs 236 may include vendor specific information. In some embodiments, a key identifier is used to indicate which master key is being used for session key derivation. The key name may be contained within a payload IE, such as EAPOL-Key IE 232, of the common protocol.

Figure 3:
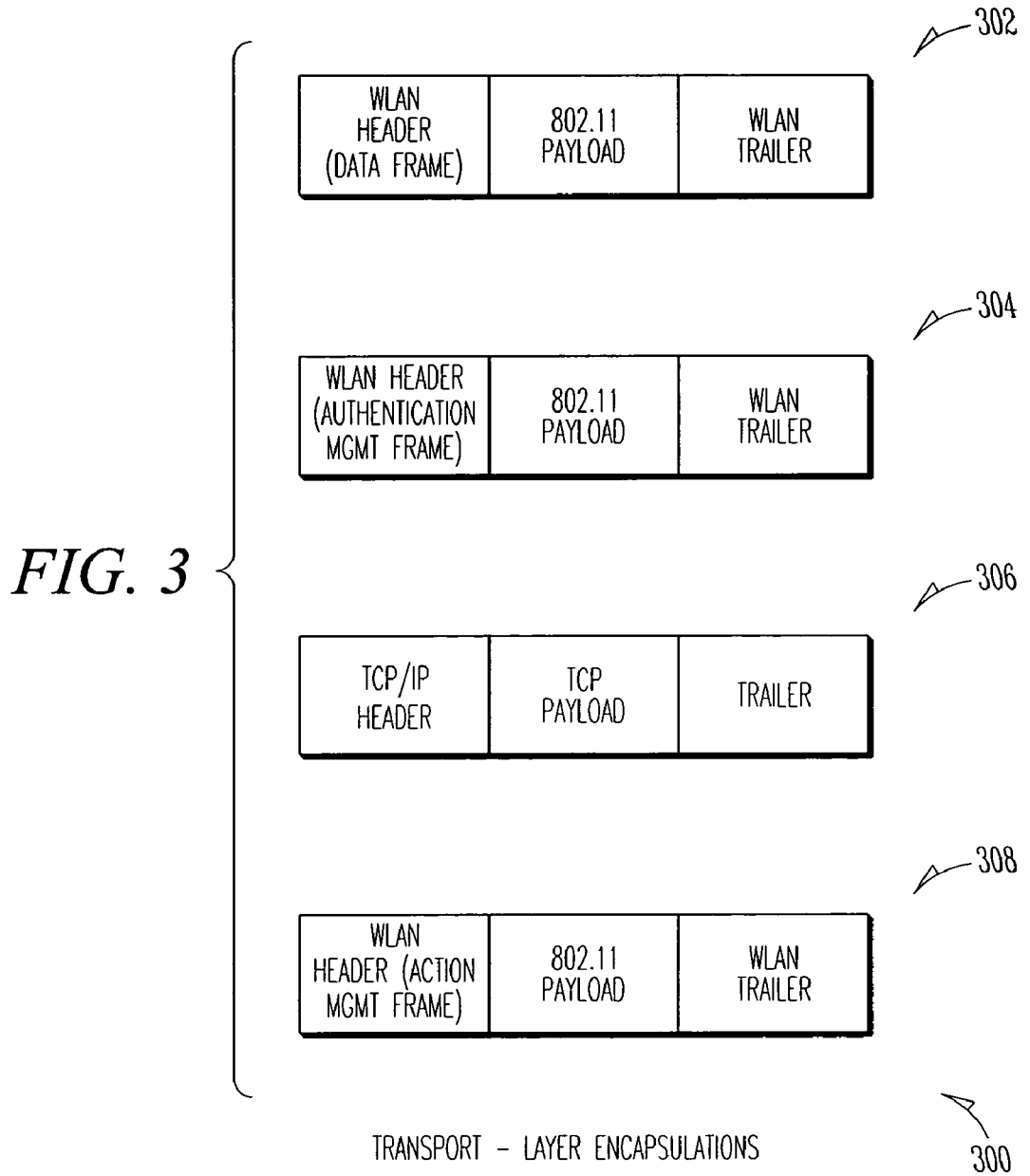
FIG. 3 illustrates examples of transport-layer encapsulations in accordance with some embodiments of the present invention.

FIG. 3 illustrates examples of transport-layer encapsulations in accordance with some embodiments of the present invention. Transport-layer encapsulations 300 include, for example, WLAN data frame encapsulation 302, WLAN authentication management frame encapsulation 304, TCP/IP encapsulation 306 and WLAN action management frame encapsulation 308. Other transport-layer encapsulations may also be suitable. In accordance with embodiments of the present invention, a common protocol message may be delivered as the payload encapsulated within one of transport-layer encapsulations 300. In some embodiments, a common protocol message, such as the common protocol message in accordance with structure 202 (FIG. 2), may comprise the payload portion of any of transport-layer encapsulations 300.

In accordance with the examples illustrated in FIG. 3, WLAN data frame encapsulation 302 may include a WLAN header, may encapsulate a WLAN data payload, such as an IEEE 802.11 payload, and may include a WLAN trailer to form a WLAN data frame. WLAN authentication management frame encapsulation 304 may also include a WLAN header, may encapsulate a WLAN management frame payload, such as an IEEE 802.11 management payload, and may include a WLAN trailer to form a WLAN authentication management frame. TCP/IP encapsulation 306 may include a TCP/IP header, may encapsulate a TCP payload, and may include a trailer to form a TCP/IP frame. WLAN action management frame encapsulation 308 may include a WLAN header, may encapsulate a WLAN management frame payload, and may include a WLAN trailer to form a WLAN action management frame.

Figure 4:
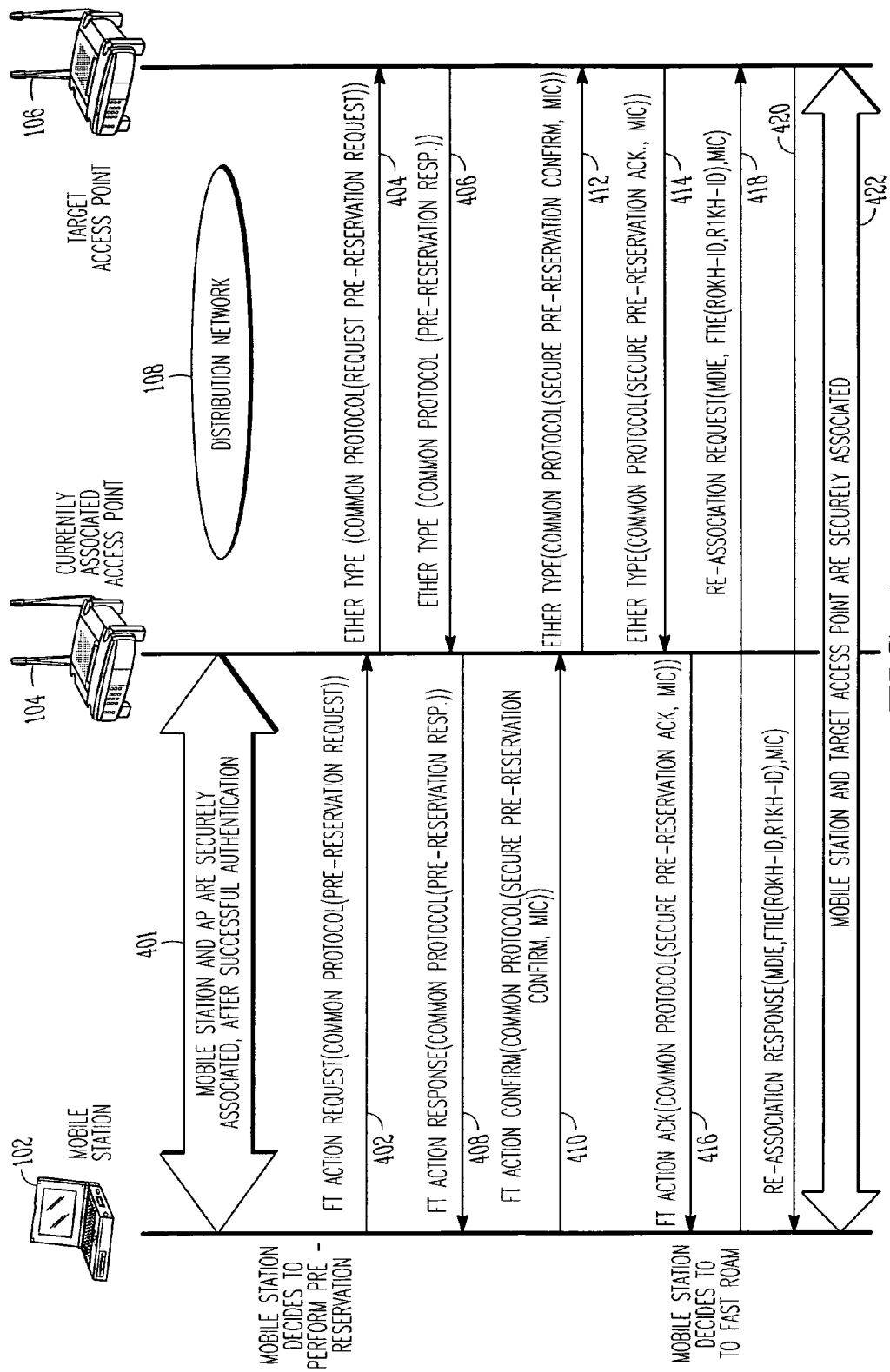
FIG. 4 illustrates an example exchange of messages for performing fast roaming in accordance with some embodiments of the present invention.

FIG. 4 illustrates an example exchange of messages for performing fast roaming in accordance with some embodiments of the present invention. The exchange of messages illustrated in FIG. 4 may allow a mobile station, such as mobile station 102, to perform fast roaming. In this example, mobile station 102 communicates through currently associated access point 104 to reserve bandwidth and/or establish communication session parameters with a target access point, such as one of access points 106. In other embodiments, mobile station 102 may reserve bandwidth and/or establish communication session parameters with more than one target access point. In other embodiments, mobile station 102 may reserve bandwidth and/or establish communication session parameters directly with one or more target access points, rather than communicating through associated access point 104. Although FIG. 4 illustrates the exchange of messages for performing fast roaming through pre-reservation request and response, message exchanges for base mechanism request and response, as well as query request and response may be similar.

As illustrated in FIG. 4, mobile station 102 may be currently associated with access point 104 after a successful authentication by an authentication server, such as authentication server 112 (FIG. 1). Communications 401 may be exchanged between mobile station 102 and currently associated access point 104 as illustrated.

When mobile station 102 decides to pre-reserve bandwidth and/or pre-establish communication session parameters for fast roaming, a fast transition (FT) action request message, such as pre-reservation request message 402, may be sent in accordance with a common protocol to access point 104. The common protocol message may have structure 202 (FIG. 2) and may be wrapped in a first transport-layer encapsulation. The first transport-layer encapsulation may be a WLAN type of encapsulation, although the scope of the invention is not limited in this respect. Access point 104 (FIG. 1) may rewrap the pre-reservation request message 402 and transfer the pre-reservation request message 404 wrapped with a second transport-layer protocol to one or more target access points, such as target access point 106. In one example, when distribution system 108 is an Ethernet type network, pre-reservation request message 404 may be wrapped in an Ethernet type of transport-layer encapsulation. In another example, when distribution system 108 is a BWA network (e.g., an IEEE std. 802.16-based network) pre-reservation request message 404 may be wrapped in a transport-layer encapsulation suitable for the BWA network.

Target access point 106 may respond with secure reservation response message 406 in accordance with the common protocol, wrapped in a transport-layer encapsulation such as the second transport-layer encapsulation, although the scope of the invention is not limited in this respect. Associated access point 104 may rewrap the secure reservation response message 406 and send secure reservation response message 408 to mobile station 102 wrapped in a transport-layer encapsulation such as the first-transport-layer encapsulation, although the scope of the invention is not limited in this respect. Secure reservation response message 408 may indicate to mobile station 102 that bandwidth will be reserved and that communication session keys may be established. Mobile station 102 may generate the session keys for subsequent communications with target access point 106 based on secure reservation response message 408. In some embodiments, secure reservation response message 408 may be an FT action response message wrapped in a transport-layer encapsulation such as the first transport-layer encapsulation, although the scope of the invention is not limited in this respect.

Mobile station 102 may wish to confirm the pre-reservation response by sending secure pre-reservation confirmation message 410 in accordance with the common protocol wrapped in a transport-layer encapsulation such as the first transport-layer encapsulation, although the scope of the invention is not limited in this respect. Associated access point 104 may rewrap pre-reservation confirmation message 410 in a transport-layer encapsulation, such as the second transport-layer encapsulation, and may send secure pre-reservation confirmation message 412 to target access point 106. Secure pre-reservation confirmation messages 410 and 412 may include cryptographic message integrity code 210 (FIG. 2). Target access point 106 may respond with secure pre-reservation acknowledgement message 414 in accordance with the common protocol wrapped in a transport-layer encapsulation such as the second transport-layer encapsulation, although the scope of the invention is not limited in this respect. Associated access point 104 may rewrap secure pre-reservation acknowledgement message 414 and send secure pre-reservation acknowledgement message 416 to mobile station 102 in accordance with the common protocol wrapped in a transport-layer encapsulation such as the first transport-layer encapsulation, although the scope of the invention is not limited in this respect. In some embodiments, secure pre-reservation acknowledgement message 416 may be an FT action acknowledge (ACK) message. In these embodiments, structure 202 (FIG. 2) of the common protocol remains unchanged within the various transport-layer protocols.

In accordance with some embodiments, secure reservation response message 406 may be sent in accordance with the common protocol using a different transport-layer encapsulation than pre-reservation request message 404. Furthermore, pre-reservation acknowledgement message 414 may be sent in accordance with the common protocol using a different transport-layer encapsulation than secure pre-reservation acknowledgement message 416. In accordance with some embodiments, there is no requirement that any one or more of messages 402, 404, 406, 408, 410, 412, 414 and 416 use the same transport-layer encapsulation. The use of the common protocol may allow for this transport-layer flexibility that is not provided in conventional networks.

At this point, mobile station 102 may have pre-reserved bandwidth and/or may have pre-established communication session parameters with target access point 106. Mobile station 102 may exchange messages 402 through 414 either directly or indirectly with one or more other target access points to pre-reserve bandwidth and/or pre-establish communication session parameters, although the scope of the invention is not limited in this respect.

When mobile station 102 decides to roam (i.e., to associate with one of the target access points), mobile station 102 may send a secured communication station establishment message, such as secured reassociation request message 418 in accordance with the common protocol within the first transport-layer encapsulation. The secured communication station establishment message may be sent either directly to a selected one of the target access points 106 or indirectly through currently associated access point 104 to the selected target access point. Secured reassociation request message 418 and secured reassociation response message 420 may be secured using cryptographic message integrity code 210 (FIG. 2). The selected target access point may respond with reassociation response message 420. Mobile station 102 and the selected target access point are then securely associated and may directly communicate messages 422. The exchange of messages 402 through 420 may be repeated again for fast roaming to another target access point.

As illustrated in FIG. 4, in some embodiments, secured reassociation request message 418 and secured reassociation response message 420, in accordance with the common protocol, may include mobility domain information element (MDIE), corresponding to mobility domain IE 224 (FIG. 2), fast transition information element (FTIE), corresponding to fast transition IE 226 (FIG. 2), and cryptographic message integrity code 210 (FIG. 2). The FTIE may include key holder IDs illustrated as R0KH-ID and R1KH-ID.

Referring to FIGS. 1 through 4 together, in some embodiments, mobile station 102 may send a request message in accordance with a common protocol either directly to one or more target access points 106 or indirectly through currently associated access point 104. In these embodiments, when the mobile station 102 decides to roam, mobile station 102 may send a secured communication session establishment message in accordance with the common protocol either directly to a selected target access points 116 or indirectly through the currently associated access point 104 to selected target access point 116. Predetermined structure 202 of the common protocol including an integrity check may remain unchanged within various transport-layer protocols.

In accordance with some embodiments, the request message may either be a pre-reservation request message, a base mechanism request message, or a query request message in accordance with a common protocol. In these embodiments, the pre-reservation request message and the base mechanism request message may pre-reserve bandwidth and pre-establish communication session parameters with one of target access points 106. In these embodiments, the query request message may check capacities of one of target access points 106 without pre-reserving bandwidth or establishing communication session parameters.

In accordance with some embodiments, the request message may be sent during a current communication session, such as a Voice-over-IP or Video-over-IP communication session. In these embodiments, the pre-established communication session parameters may comprise information for deriving a session key for each of at least two of the target access points and quality-of-service level parameters in accordance with the current communication session.

In accordance with some embodiments, predetermined structure 202 of the common protocol may have at least common protocol header 206 and common protocol payload 208. The secured communication session establishment message in accordance with the common protocol may include cryptographic message integrity code 210 for use in source authentication and verifying the integrity of the common protocol header 206 and the payload 208. In these embodiments, cryptographic message integrity code 210 is calculated based on common protocol header 206 and common protocol payload 208.

In accordance with some embodiments, when the request message is sent directly to the one or more target access points 106, the request message may be sent over direct path 117 within a single transport channel. When the request message is sent indirectly through currently associated access point 104 to one or more of target access points 106, the request message may be sent over indirect path 107 within more than one transport channel. When mobile station 102 sends the secured communication session establishment message directly to selected target access point 116, the secured communication session establishment message may be sent over the direct path 117 within the single transport channel. When mobile station 102 sends the secured communication session establishment message indirectly through currently associated access point 104 to selected target access point 116, the secured communication session establishment message may be sent over indirect path 107 within the more than one transport channel.

In accordance with some embodiments, when the request message is sent directly to one or more of target access points 106, the request message may be wrapped in a first transport-layer encapsulation. When the request message is sent indirectly through currently associated access point 104 to one or more target access points 106, the request message may be rewrapped in a second transport-layer encapsulation by currently associated access point 104 for communication to selected target access point 116 through network distribution system 108.

In accordance with some embodiments, when the secured communication session establishment message is sent directly to selected target access point 116, the secured communication session establishment message may be wrapped in the first transport-layer encapsulation. When the secured communication session establishment message is sent indirectly through currently associated access point 104 to selected target access point 116, the secured communication session establishment message may be rewrapped in the second transport-layer encapsulation by currently associated access point 104 for communication to selected target access point 116 through network distribution system 108.

In accordance with some embodiments, the first transport-layer encapsulation may comprise a WLAN transport-layer encapsulation and network distribution system 108 may include a combination of several types of networks including a TCP/IP network, a BWA network, a WLAN network, or a cellular packet data network. In these embodiments, the second transport-layer encapsulation may comprise a TCP/IP transport-layer encapsulation when the network distribution system includes the TCP/IP network. When network distribution system 108 includes the BWA network, the secured communication session establishment message may be rewrapped in a BWA network transport-layer encapsulation. When network distribution system 108 includes the cellular packet data network, the secured communication session establishment message is rewrapped in a cellular packet data network transport-layer encapsulation.

In accordance with some embodiments, in response to the secured communication session establishment message, mobile station 102 may receive an acknowledge message in accordance with the common protocol within the first transport-layer encapsulation either directly from one of target access points 106 or indirectly through the currently associated access point 104 from one of target access points 106. The acknowledge message may acknowledge pre-reserved bandwidth and pre-established communication session parameters with one of target access points 106. In accordance with some embodiments, the acknowledge message includes cryptographic message integrity code 210 for use in source authentication and verifying integrity of common protocol header 206 and common protocol payload 208 of the acknowledge message. In some embodiments, common protocol header 206, common protocol payload 208 and cryptographic message integrity code 210 may be wrapped in the first transport-layer encapsulation.

Figure 5:
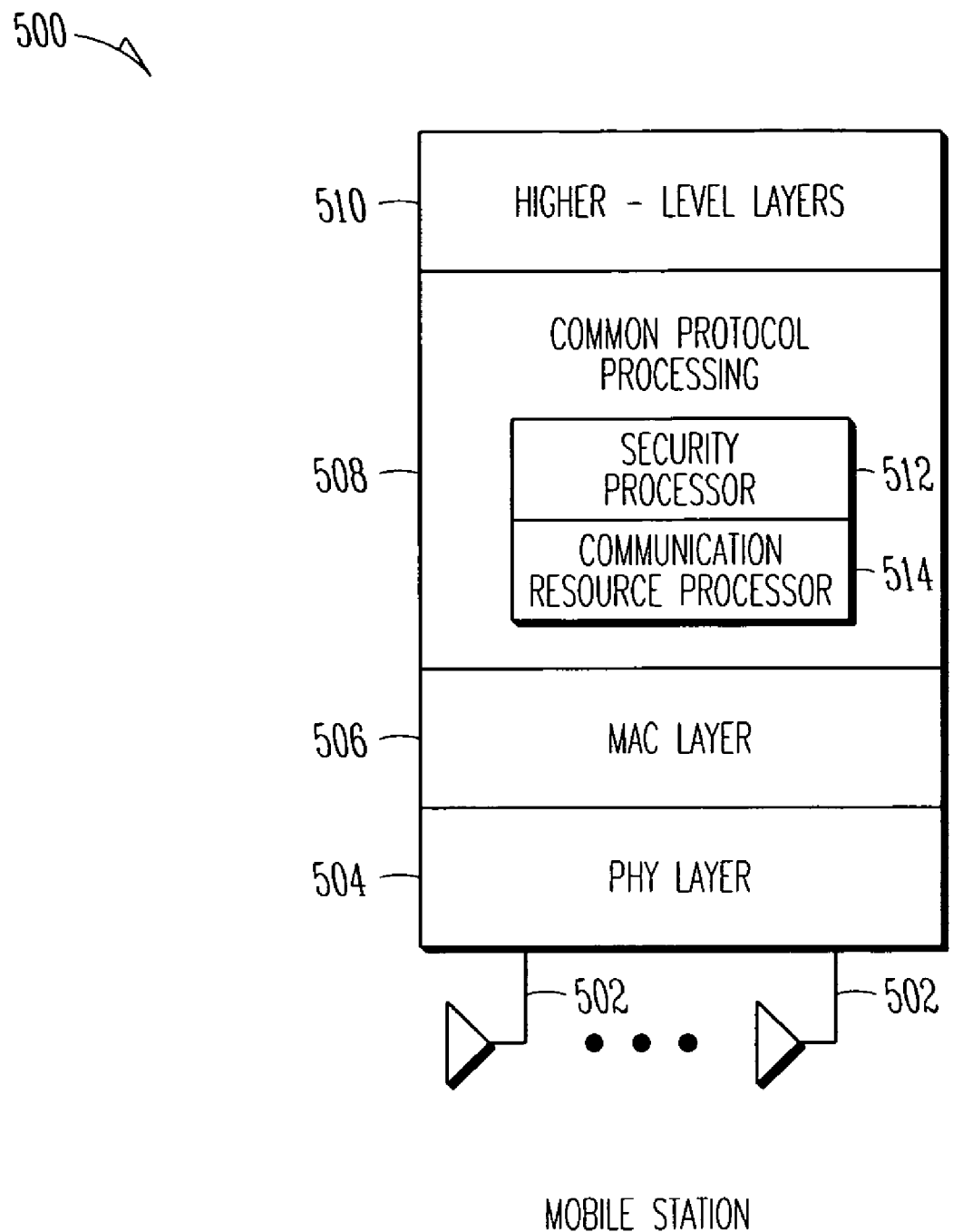
FIG. 5 illustrates a functional block diagram of a mobile station in accordance with some embodiments of the present invention.

FIG. 5 illustrates a functional block diagram of a mobile station in accordance with some embodiments of the present invention. Mobile station 500 may correspond to mobile station 102 (FIG. 1). In accordance with some embodiments, mobile station 500 may comprise physical-layer (PHY) circuitry 504 to generate and process radio-frequency (RF) communications with other communication stations such as access points, media-access control (MAC) layer circuitry 506 to control access to the physical medium and perform some of the operations described above, and higher-level layers 510 which may include one or more applications running thereon. In some embodiments, the higher-level layers 510 may include voice-over-IP and video-over-IP applications, as well as other applications. In some embodiments, mobile station 500 may include one or more antennas 502 coupled to PHY circuitry 504 to transmit and receive the RF communications.

Mobile station 502 may also include common protocol processing circuitry 508 to generate messages for communicating with other communication stations including access points 104 and 106 (FIG. 1). In some embodiments, common protocol processing circuitry 508 may generate messages, such as messages 402, 410 and 418 (FIG. 4) and may process messages, such as messages 404, 412 and 420 (FIG. 4) as described above. In some embodiments, common protocol processing circuitry 508 may be part of one or more layers of mobile station 500. In some embodiments, common protocol processing circuitry 508 may include security processor 512 and communication resource processor 514. In these embodiments, security processor 512 may perform security-related processing operations of the common protocol including the generation of both secured and non-secured messages. In these embodiments, communication resource processor 514 may perform other processing operations for the common protocol, such as quality-of-service level related processing and message related processing. Although security processor 512 and communication resource processor 514 are depicted as separate blocks in FIG. 5, security processor 512 and communication resource processor 514 may be integrated into a single component.

In some embodiments, the various functional elements of mobile station 500 illustrated in FIG. 5 may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of mobile station 500 may refer to one or more processes operating on one or more processing elements.

In some embodiments, mobile station 500 may communicate multicarrier communication signals, such as orthogonal frequency division multiplexed (OFDM) communication signals, over a multicarrier communication channel. In some embodiments, the communication signals may be communicated in accordance with a multiple access technique, such as orthogonal frequency division multiple access (OFDMA). The multicarrier communication channel may be within a predetermined frequency spectrum and may comprise a plurality of orthogonal subcarriers. In some embodiments, the signals may be defined by closely spaced subcarriers. Each subcarrier may have a null at substantially a center frequency of the other subcarriers and/or each subcarrier may have an integer number of cycles within a symbol period, although the scope of the invention is not limited in this respect. In some alternate embodiments, mobile station 500 may communicate using spread-spectrum signals.

In some embodiments, mobile station 500 may be a Wireless Fidelity (WiFi) communication station that may operate within a wireless local area network, while in other embodiments mobile station 500 may be a BWA network communication, such as Worldwide Interoperability for Microwave Access (WiMax) station that may operate within a BWA network, although the scope of the invention is not limited in this respect as mobile station 500 may be almost any wireless communication device.

In some embodiments, the frequency spectrums for the communication signals may comprise either a 5 gigahertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for the multicarrier communication signals may comprise frequencies between 2 and 11 GHz, although the scope of the invention is not limited in this respect.

In some embodiments, mobile station 500 and access points 104, 106 (FIG. 1) may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks (WLANs), although the scope of the invention is not limited in this respect as they may also be suitable to transmit and/or receive communications in accordance with other techniques and standards. In some embodiments, mobile station 500 and access points 104, 106 (FIG. 1) may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999" and Metropolitan Area Networks—Specific Requirements—Part 16: "Air Interface for Fixed Broadband Wireless-access Systems" April 2005, and related amendments/versions. In some embodiments, fast roaming may be performed in accordance with the IEEE design proposal for fast transitions, although the scope of the invention is not limited in this respect. In these embodiments, an integrity check within common protocol messages may be independent of the route taken by the messages thereby avoiding layer-level violations associated with some convention approaches, such as the multiple fast roaming approaches and designs within the IEEE 802.11 specifications referenced above.

In some embodiments, mobile station 500 may be a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Antennas 502 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, two or more antennas may be used. In some of these MIMO embodiments, instead of two or more antennas, a single antenna with multiple apertures may be used. In these embodiments, each aperture may be considered a separate antenna. In some embodiments, antennas 502 may be effectively separated to take advantage of spatial diversity and the different channel characteristics that may result between each of the antennas and access points 104 and 106 (FIG. 1). In some embodiments, antennas 502 may be separated by up to 1/10 of a wavelength or more, although the scope of the invention is not limited in this respect.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, the invention may lie in less than all features of a single disclosed embodiment. Thus, the following claims are hereby incorporated into the detailed description, with each claim standing on its own as a separate preferred embodiment.

What is claimed is:

1. A method for fast roaming comprising:
    sending, by a mobile station, a request message in accordance with a fast-roaming protocol either directly to one or more target access points or indirectly through a currently associated access point; and
    sending, by the mobile station when the mobile station decides to roam, a secured communication session establishment message in accordance with the fast-roaming protocol either directly to a selected one of the one or more target access points or indirectly through the currently associated access point to the selected target access point,
    wherein the fast-roaming protocol has a predetermined structure including an integrity check that remains unchanged within various transport-layer protocols,
    wherein the predetermined structure of the fast-roaming protocol comprises at least a common protocol header and a payload,
    wherein the secured communication session establishment message in accordance with the fast-roaming protocol includes a cryptographic message integrity code for use in source authentication and verifying the integrity of the common protocol header and the payload, and
    wherein the cryptographic message integrity code is calculated based on the common protocol header and the payload.

2. The method of claim 1 wherein the request message is either a pre-reservation request message, a base mechanism request message, or a query request message in accordance with the fast-roaming protocol, wherein the pre-reservation request message and the base mechanism request message pre-reserve bandwidth and pre-establish communication session parameters with the one or more of the target access points, and wherein the query request message checks capacities of the one or more of the target access points without pre-reserving bandwidth or establishing communication session parameters.

3. The method of claim 1 wherein sending the request message is performed during a current communication session comprising either a Voice-over-Internet Protocol (IP) or Video-over-IP communication session, and wherein the pre-established communication session parameters comprise information for deriving a session key for each of at least two of the target access points and quality-of-service level parameters in accordance with the current communication session.

4. The method of claim 1 wherein the common protocol header comprises:

a protocol identifier field to indicate that the message is structured in accordance with the fast-roaming protocol;

a version number field to indicate a version of the fast-roaming protocol in which the message is structured;

an instance identifier field to distinguish between multiple running instances of the fast-roaming protocol;

a message type field to indicate whether the message is a pre-reservation request message, a pre-reservation response message, a secure pre-reservation confirmation message, a secure pre-reservation acknowledge message, a secured reassociation request message, or a secured reassociation response message;

a source address field to indicate a source address of the message; and a final destination address field to indicate a final destination address of the message.

5. The method of claim 1 wherein when the request message is sent directly to the one or more target access points, the request message is sent over a direct path within a single transport channel, wherein when the request message is sent indirectly through the currently associated access point to the one or more target access points, the request message is sent over an indirect path within more than one transport channel, wherein when the mobile station sends the secured communication session establishment message directly to the selected target access point, the secured communication session establishment message is sent over the direct path within the single transport channel, and wherein when the mobile station sends the secured communication session establishment message indirectly through the currently associated access point to the selected target access point, the secured communication session establishment message is sent over the indirect path within the more than one transport channel.

6. The method of claim 5 wherein when the request message is sent directly to the one or more target access points, the request message is wrapped in a first transport-layer encapsulation, and wherein when the request message is sent indirectly through the currently associated access point to the one or more target access points, the request message is rewrapped in a second transport-layer encapsulation by the currently associated access point for communication to the selected target access point through a network distribution system.

7. The method of claim 5 wherein when the secured communication session establishment message is sent directly to the selected target access point, the secured communication session establishment message is wrapped in a first transport-layer encapsulation, and wherein when the secured communication session establishment message is sent indirectly through the currently associated access point to the selected target access point, the secured communication session establishment message is rewrapped in a second transport-layer encapsulation by the currently associated access point for communication to the selected target access point through the network distribution system.

8. The method of claim 7 wherein the first transport-layer encapsulation comprises a wireless local area network (WLAN) transport-layer encapsulation, wherein the network distribution system comprises a combination of one or more of either a transmission-control-protocol/Internet-protocol (TCP/IP) network, a broadband wireless-access (BWA) network, a WLAN network, or a cellular packet data network, and wherein the second transport-layer encapsulation comprises a TCP/IP transport-layer encapsulation when the network distribution system includes the TCP/IP network.

9. The method of claim 8 wherein when the network distribution system includes the BWA network, the secured communication session establishment message is rewrapped in a BWA network transport-layer encapsulation, and wherein when the network distribution system includes the cellular packet data network, the secured communication session establishment message is rewrapped in a cellular packet data network transport-layer encapsulation.

10. The method of claim 6 wherein in response to the secured communication session establishment message, the method further comprises:

receiving an acknowledge message in accordance with the fast-roaming protocol within the first transport-layer encapsulation either directly from the one or more target access points or indirectly through the currently associated access point from the one or more target access points, wherein the acknowledge message acknowledges pre-reserved bandwidth and pre-established communication session parameters with the one or more of the target access points, wherein the acknowledge message includes a message integrity code for use in source authentication and verifying integrity of a common protocol header and a payload of the acknowledge message, and wherein the header, the payload and the message integrity code are wrapped in the first transport-layer encapsulation.

11. A mobile station comprising:

common protocol processing circuitry to generate a request message in accordance with a fast-roaming protocol; and physical layer circuitry to send the request message either directly to one or more target access points or indirectly through a currently associated access point to the one or more target access points, wherein the common protocol processing circuitry further generates, when the mobile station decides to roam, a secured communication session establishment message in accordance with the fast-roaming protocol, and wherein the physical layer circuitry sends the secured communication session establishment message either directly to a selected one of the one or more target access points or indirectly through the currently associated access point to the selected target access point, wherein the fast-roaming protocol has a predetermined structure including an integrity check that remains unchanged within various transport-layer protocols, wherein the predetermined structure of the fast-roaming protocol comprises at least a common protocol header and a payload, wherein the common protocol processing circuitry includes a security processor to generate the secured communication session establishment message in accordance with the fast-roaming protocol to include a cryptographic message integrity code for use in source authentication and verifying the integrity of the common protocol header and the payload, and wherein the security processor calculates the cryptographic message integrity code based on the common protocol header and the payload.

12. The mobile station of claim 11 wherein the request message is either a pre-reservation request message, a base mechanism request message, or a query request message in accordance with the fast-roaming protocol, wherein the pre-reservation request message and the base mechanism request message pre-reserve bandwidth and pre-establish communication session parameters with the one or more of the target access points, and wherein the query request message checks capacities of the one or more of the target access points without pre-reserving bandwidth or establishing communication session parameters.

13. The mobile station of claim 11 wherein the physical layer circuitry sends the request message during a current communication session comprising either a Voice-over-Internet Protocol (IP) or Video-over-IP communication session, and wherein the pre-established communication session parameters comprise information for deriving a session key for each of at least two of the target access points and quality-of-service level parameters in accordance with the current communication session.

14. The mobile station of claim 11 wherein the common protocol header comprises:

a protocol identifier field to indicate that the message is structured in accordance with the fast-roaming protocol;

a version number field to indicate a version of the fast-roaming protocol in which the message is structured;

an instance identifier field to distinguish between multiple running instances of the fast-roaming protocol;

a message type field to indicate whether the message is a pre-reservation request message, a pre-reservation response message, a secure pre-reservation confirmation message, a secure pre-reservation acknowledge message, a secured reassociation request message, or a secured reassociation response message;

a source address field to indicate a source address of the message; and a final destination address field to indicate a final destination address of the message.

15. The mobile station of claim 12 wherein when the request message is sent directly to the one or more target access points, the request message is sent over a direct path within a single transport channel, wherein when the request message is sent indirectly through the currently associated access point to the one or more target access points, the request message is sent over an indirect path within more than one transport channel, wherein when the mobile station sends the secured communication session establishment message directly to the selected target access point, the secured communication session establishment message is sent over the direct path within the single transport channel, and wherein when the mobile station sends the secured communication session establishment message indirectly through the currently associated access point to the selected target access point, the secured communication session establishment message is sent over the indirect path within the more than one transport channel.

16. A mobile station comprising:

common protocol processing circuitry to generate a request message in accordance with a fast-roaming protocol; and physical layer circuitry to send the request message either directly to one or more target access points or indirectly through a currently associated access point to the one or more target access points, wherein the common protocol processing circuitry further generates, when the mobile station decides to roam, a secured communication session establishment message in accordance with the fast-roaming protocol, and wherein the physical layer circuitry sends the secured communication session establishment message either directly to a selected one of the one or more target access points or indirectly through the currently associated access point to the selected target access point, wherein the fast-roaming protocol has a predetermined structure including an integrity check that remains unchanged within various transport-layer protocols, wherein the request message is either a pre-reservation request message, a base mechanism request message, or a query request message in accordance with the fast-roaming protocol, wherein the pre-reservation request message and the base mechanism request message pre-reserve bandwidth and pre-establish communication session parameters with the one or more of the target access points, wherein the query request message checks capacities of the one or more of the target access points without pre-reserving bandwidth or establishing communication session parameters, wherein when the request message is sent directly to the one or more target access points, the request message is sent over a direct path within a single transport channel, wherein when the request message is sent indirectly through the currently associated access point to the one or more target access points, the request message is sent over an indirect path within more than one transport channel, wherein when the mobile station sends the secured communication session establishment message directly to the selected target access point, the secured communication session establishment message is sent over the direct path within the single transport channel, wherein when the mobile station sends the secured communication session establishment message indirectly through the currently associated access point to the selected target access point, the secured communication session establishment message is sent over the indirect path within the more than one transport channel, wherein when the request message is sent directly to the one or more target access points, the common protocol processing circuitry wraps the request message in a first transport-layer encapsulation, and wherein when the request message is sent indirectly through the currently associated access point to the one or more target access points, the request message is rewrapped in a second transport-layer encapsulation by the currently associated access point for communication to the selected target access point through a network distribution system.

17. The mobile station of claim 16 wherein in response to the secured communication session establishment message, the physical layer circuitry receives an acknowledge message in accordance with the fast-roaming protocol within the first transport-layer encapsulation either directly from the one or more target access points or indirectly through the currently associated access point from the one or more target access points, wherein the common protocol processing circuitry further includes a communication resource processor to process the acknowledge message to acknowledge pre-reserved bandwidth and pre-established communication session parameters with the one or more of the target access points, wherein the acknowledge message includes a message integrity code for use by the security processor in source authentication and verifying integrity of a common protocol header and a payload of the acknowledge message, and wherein the header, the payload and the message integrity code are wrapped in the first transport-layer encapsulation.

18. A mobile station comprising:

common protocol processing circuitry to generate a request message in accordance with a fast-roaming protocol; and physical layer circuitry to send the request message either directly to one or more target access points or indirectly through a currently associated access point to the one or more target access points, wherein the common protocol processing circuitry further generates, when the mobile station decides to roam, a secured communication session establishment message in accordance with the fast-roaming protocol, and wherein the physical layer circuitry sends the secured communication session establishment message either directly to a selected one of the one or more target access points or indirectly through the currently associated access point to the selected target access point, wherein the fast-roaming protocol has a predetermined structure including an integrity check that remains unchanged within various transport-layer protocols, wherein the request message is either a pre-reservation request message, a base mechanism request message, or a query request message in accordance with the fast-roaming protocol, wherein the pre-reservation request message and the base mechanism request message pre-reserve bandwidth and pre-establish communication session parameters with the one or more of the target access points, wherein the query request message checks capacities of the one or more of the target access points without pre-reserving bandwidth or establishing communication session parameters, wherein when the request message is sent directly to the one or more target access points, the request message is sent over a direct path within a single transport channel, wherein when the request message is sent indirectly through the currently associated access point to the one or more target access points, the request message is sent over an indirect path within more than one transport channel, wherein when the mobile station sends the secured communication session establishment message directly to the selected target access point, the secured communication session establishment message is sent over the direct path within the single transport channel, wherein when the mobile station sends the secured communication session establishment message indirectly through the currently associated access point to the selected target access point, the secured communication session establishment message is sent over the indirect path within the more than one transport channel, wherein when the secured communication session establishment message is sent directly to the selected target access point, the common protocol processing circuitry wraps the secured communication session establishment message in a first transport-layer encapsulation, and wherein when the secured communication session establishment message is sent indirectly through the currently associated access point to the selected target access point, the secured communication session establishment message is rewrapped in a second transport-layer encapsulation by the currently associated access point for communication to the selected target access point through the network distribution system.

19. The mobile station of claim 18 wherein the first transport-layer encapsulation comprises a wireless local area network (WLAN) transport-layer encapsulation, wherein the network distribution system comprises a combination of one or more of either a transmission-control-protocol/Internet-protocol (TCP/IP) network, a broadband wireless-access (BWA) network, a WLAN network, or a cellular packet data network, and wherein the second transport-layer encapsulation comprises a TCP/IP transport-layer encapsulation when the network distribution system includes the TCP/IP network.

20. The mobile station of claim 19 wherein when the network distribution system includes the BWA network, the secured communication session establishment message is rewrapped in a BWA network transport-layer encapsulation, and wherein when the network distribution system includes the cellular packet data network, the secured communication session establishment message is rewrapped in a cellular packet data network transport-layer encapsulation.

21. A system comprising:

one or more substantially omnidirectional antennas; and common protocol processing circuitry to generate a request message in accordance with a fast-roaming protocol and physical layer circuitry coupled to the antennas to send the request message either directly to one or more target access points or indirectly through a currently associated access point to the one or more target access points, wherein the common protocol processing circuitry further generates, when a mobile station decides to roam, a secured communication session establishment message in accordance with the fast-roaming protocol, and wherein the physical layer circuitry sends the secured communication session establishment message either directly to a selected one of the one or more target access points or indirectly through the currently associated access point to the selected target access point, wherein the fast-roaming protocol has a predetermined structure including an integrity check that remains unchanged within various transport-layer protocols, wherein the predetermined structure of the fast-roaming protocol comprises at least a common protocol header and a payload, wherein the common protocol processing circuitry includes a security processor to generate the secured communication session establishment message in accordance with the fast-roaming protocol to include a cryptographic message integrity code for use in source authentication and verifying the integrity of the common protocol header and the payload, and wherein the security processor calculates the cryptographic message integrity code based on the common protocol header and the payload.

22. The system of claim 21 wherein the request message is either a pre-reservation request message, a base mechanism request message, or a query request message in accordance with the fast-roaming protocol, wherein the pre-reservation request message and the base mechanism request message pre-reserve bandwidth and pre-establish communication session parameters with the one or more of the target access points, and wherein the query request message checks capacities of the one or more of the target access points without pre-reserving bandwidth or establishing communication session parameters.

23. The system of claim 21 wherein the physical layer circuitry sends the request message during a current communication session comprising either a Voice-over-Internet Protocol (IP) or Video-over-IP communication session, and wherein the pre-established communication session parameters comprise information for deriving a session key for each of at least two of the target access points and quality-of-service level parameters in accordance with the current communication session.

24. A computer-readable storage medium that stores instructions for execution by one or more processors to perform operations for fast roaming between access points of a wireless network, the operations comprising:

sending a request message in accordance with a fast-roaming protocol either directly to one or more target access points or indirectly through a currently associated access point; and sending, when the mobile station decides to roam, a secured communication session establishment message in accordance with the fast-roaming protocol either directly to a selected one of the one or more target access points or indirectly through the currently associated access point to the selected target access point, wherein the fast-roaming protocol has a predetermined structure including an integrity check that remains unchanged within various transport-layer protocols, wherein the predetermined structure of the fast-roaming protocol comprises at least a common protocol header and a payload, wherein the secured communication session establishment message in accordance with the fast-roaming protocol includes a cryptographic message integrity code for use in source authentication and verifying the integrity of the common protocol header and the payload, and wherein the cryptographic message integrity code is calculated based on the common protocol header and the payload.

25. The computer-readable storage medium of claim 24 wherein the request message is either a pre-reservation request message, a base mechanism request message, or a query request message in accordance with the fast-roaming protocol, wherein the pre-reservation request message and the base mechanism request message pre-reserve bandwidth and pre-establish communication session parameters with the one or more of the target access points, and wherein the query request message checks capacities of the one or more of the target access points without pre-reserving bandwidth or establishing communication session parameters.

26. The computer-readable storage medium of claim 25 wherein sending the request message is performed during a current communication session comprising either a Voice-over-Internet Protocol (IP) or Video-over-IP communication session, and wherein the pre-established communication session parameters comprise information for deriving a session key for each of at least two of the target access points and quality-of-service level parameters in accordance with the current communication session.

* * * * *